W. P. & S. G. THOMSON.
RAIL SPLICING STRUCTURE.
APPLICATION FILED MAY 15, 1912.

1,057,687.

Patented Apr. 1, 1913.
5 SHEETS—SHEET 1.

WITNESSES
R. A. Balderson
J. B. Fleming INVENTORS
Wm P. Thomson
S. G. Thomson
by Bakewell, Byrnes Parmelee,
Attys.

W. P. & S. G. THOMSON.
RAIL SPLICING STRUCTURE.
APPLICATION FILED MAY 15, 1912.

1,057,687.

Patented Apr. 1, 1913.
5 SHEETS—SHEET 2.

WITNESSES

INVENTORS

W. P. & S. G. THOMSON.
RAIL SPLICING STRUCTURE.
APPLICATION FILED MAY 15, 1912.

1,057,687.

Patented Apr. 1, 1913.
5 SHEETS—SHEET 3.

WITNESSES
INVENTORS

UNITED STATES PATENT OFFICE.

WILLIAM P. THOMSON AND SAMUEL G. THOMSON, OF PHILADELPHIA, PENNSYLVANIA, ASSIGNORS, BY MESNE ASSIGNMENTS, TO THE 100% RAIL JOINT COMPANY, OF NEW YORK, N. Y., A CORPORATION OF DELAWARE.

RAIL-SPLICING STRUCTURE.

1,057,687.  Specification of Letters Patent.  Patented Apr. 1, 1913.

Application filed May 15, 1912. Serial No. 697,482.

*To all whom it may concern:*

Be it known that we, WILLIAM P. THOMSON and SAMUEL G. THOMSON, residents of Philadelphia, in the county of Philadelphia and State of Pennsylvania, have invented a new and useful Improvement in Rail-Splicing Structures, of which the following is a full, clear, and exact description, reference being had to the accompanying drawings, forming part of this specification, in which—

Our invention has relation to a rail-splicing structure, comprising rail-splicing bars combined with rails and rail-supporting means, in such a manner as to permit of a reinforcement of the splice bar by extending the latter downwardly below the lower faces of the rail bases. In accordance with our invention, the splice bars are arranged in the structure in such a manner that the portions extending below the bottoms of the rail bases will clear the rail support to such an extent that a load imposed upon the rails will be carried by that portion only of the rail support which bears on the under faces of the rail bases. This relationship of splice bars, rails, and rail supporting means, exists regardless of whether the rail supporting means lie transversely or longitudinally of the rails. In the common practice of resting the rails upon ties which run transversely of the rails, our arrangement of the splice bar reinforcement extending downwardly below the under faces of the rail bases is accomplished so that a portion of the splice bar extending below the bottoms of the rail bases will also lie directly above the top surface of the tie; thus the tie may be located directly beneath the downwardly extending portion of the splice bar without impinging against the reinforcement in such a manner as to force the splice bar upward and consequently spoil the fit of the splice bar on the fishing angles of the rails.

An important object of our invention is to provide a railway track structure in which the rails are supported on the under faces of their bases in such fashion that a deeper reinforcement than hitherto may be added to a splice bar at points approximately midway between the middle, longitudinally, and the ends of the splice bar; this deeper reinforcement being of particular importance, when so located, because the lower extremities of the end portions of the splice bars may at the same time lie above the lower face of the rail base in accordance with the extensively prevailing present practice.

The ordinary type of angle bar, which does not extend below the bottom face of the rail base, may be reinforced by our improvement by extending the bar below the bottom of the rail, either in the form of a straight depending flange, or in the form of a head, or lateral reinforcing ribs forming the lower chord of the bar, such chord extending uniformly for the full length of the bar. In this form, the rail seat or tie plate, is so formed as to afford a clearance for the depending portion, and in this way ties, or any other form of rail support, may be located either at the ends or at the middle portions of the bars, without interference from the reinforcement below the rail base. The maximum efficiency of this structure is best attained by the use of splice bars of the form in which the width of the foot from the outer face of the web to the outer edge of the foot of the bar is made much less than the corresponding width as found in angle bars of the ordinary type.

With the present well known girder types of splice bars, which have a freely depending flange below the bottom of the rail at the mid length of the bar, our improvement provides a clearance which permits the reinforcing girder to extend longitudinally over all, or a portion of, the rail-bearing surfaces of the tie, instead of between the rail-bearing surfaces of the ties only, as is now the general practice. This feature permits the depending reinforcement of the splice bar to be decreased in depth much more gradually from its longitudinal middle toward its ends than is possible in the present practice where there is an abrupt decrease in depth occurring adjacent to the edges of the ties which lie immediately on each side of the deep reinforcing member of the splice bar. Such an abrupt change of depth, where the deep section joins the shallow section, presents a weakness at the portions of the bar which are approximately midway between the middle of the bar, longitudinally, and its ends, and this weakness prevents the deeper mid-section from being strained to its maximum capacity, even if these sections of the bar midway between its middle and its ends are strong enough to resist breakage. According to the present practice, the strains which are diverted from the longitudinal mid-section of the bar are focused at these sections midway between its middle and its ends where the bar has been abruptly changed in depth in order to permit its ends to extend over and clear the ties. Our improvement permits us to graduate the section of the bar from its greatest depth at its mid length to a point well toward the middle of the tie, or all the way across the tie, according to the requirements of the design of bar used; or we may carry the reinforcement of uniform depth throughout the entire length of the bar, as hereinafter explained in which case the rolling and finishing of such a bar is cheaper than the present practice of shearing or bulldozing girder bars.

Our invention is equally applicable to insulated joints, and in such cases the rail seat may consist entirely of insulating material, or the insulating material may be superimposed upon other material in such a manner as to make a composite rail seat, both elements of which may be necessary in order to provide the proper clearance of that portion of the splice bar which extends below the bottom of the rail base.

The precise nature of our invention will be best understood by reference to the accompanying drawings, in which we have illustrated a number of different embodiments, it being premised, however, that these are illustrative only and that the invention is susceptible of various other embodiments. In these figures, the numeral 2, wherever seen, designates the track rails, 3 the splice bars, and 4 the joint bolts.

Figure 1:
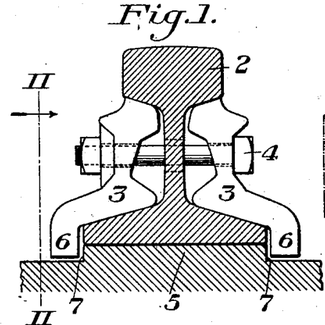
Figure 1 is a sectional view of one form of structure embodying our invention.
Figure 2:
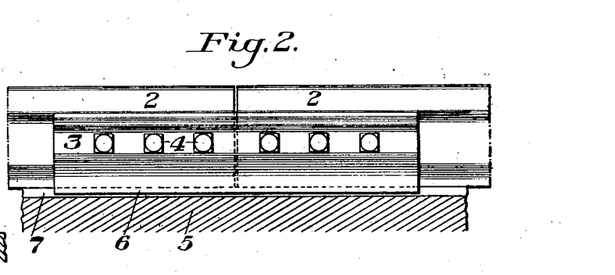
Fig. 2 is a side view of the same with the rail supports shown partly in section and partly in side elevation.

Referring first to that form of our invention shown in Figs. 1 and 2, 5 designates the rail seat, having a raised portion seating the rail bases. The splice bars 3 have each a portion 6, which extends downwardly below the bottom faces of the bases of the rails adjacent to the vertical faces 7 of the seat 5, and which provides a clearance for the portion 6. The faces 7 may be curved or slanted in any manner suitable to provide this clearance for the portion 6, as the latter is susceptible of various modifications. By reference to Fig. 2, the manner in which the rail seat clears the portion 6 at any point throughout the length of the splice bar will be readily seen. It is apparent from these Figs. 1 and 2, that neither the rail seat 5 nor the portion 6 need be continuous in order to embody our invention, but that either the seat 5 or the portion 6 may be interrupted or modified at various points throughout the length of the splice bars, without departing from the spirit of our invention.

Figure 3:
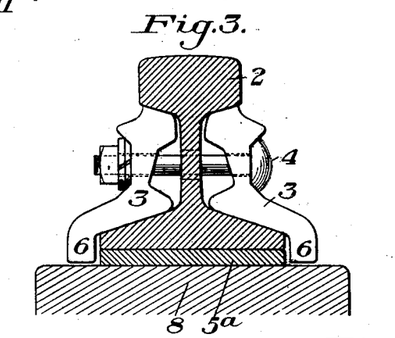
Figs. 3 and 4 are views similar to Fig. 1 but showing other forms of the invention.

In the modification shown in Fig. 3, the rail seat, instead of having a raised portion to seat the rails, consists of a separate piece 5$^a$, which is imposed upon a beam or stretcher 8 running longitudinally of the rails. The splice bars in this figure are similar to those shown in Figs. 1 and 2.

Figure 4:
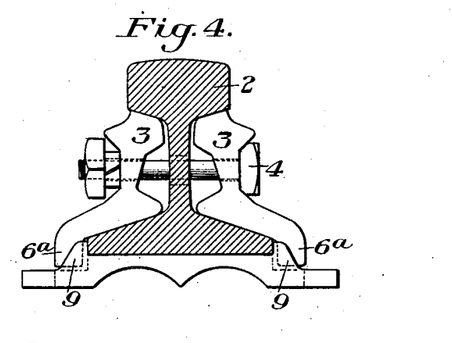

Fig. 4 shows a form in which the rail-seating member clears the deep portions 6$^a$ of the splice bars in a manner similar to that shown in Fig. 1, while at the same time, the seat has ribs or projections 9 beyond the ends of the bars to prevent creeping.

Figure 5:
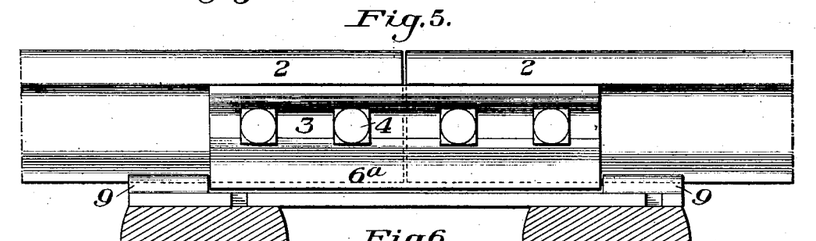
Fig. 5 is a side elevation of the structure shown in Fig. 4.
Figure 6:
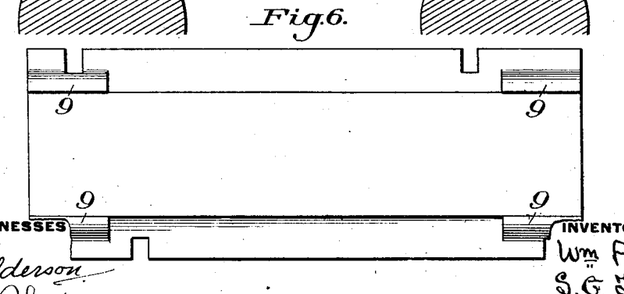
Fig. 6 is a bottom plan view of the rail seats shown in Figs. 4 and 5.

Fig. 5 shows a side elevation of Fig. 4; while Fig. 6 is a top plan view of the rail-seating member.

In the form of our invention shown in Fig. 7, the rail seat is not symmetrical, but is formed with a shoulder 10 to engage the outer edge of the rail base in a manner common to tie plate practice, while at the same time it affords proper clearances for the depending portions 6 of the splice bars, which extend below the bottom faces of the rail bases.

Figure 7:
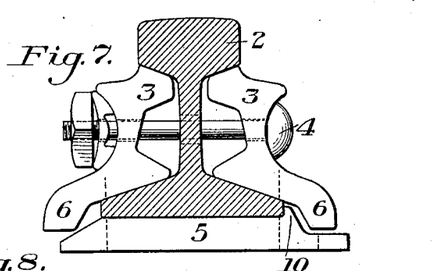
Fig. 7 is a view similar to Fig. 1 but showing still another form of the invention.
Figure 8:
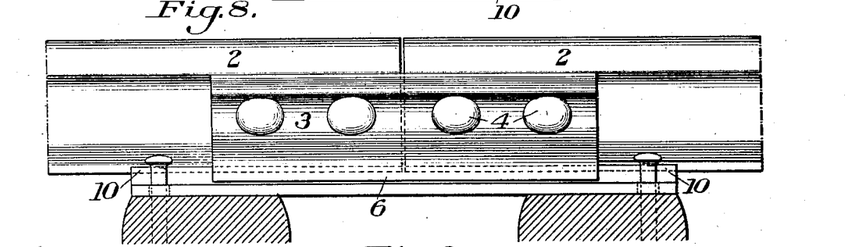
Fig. 8 is a side elevation of the structure shown in Fig. 7.
Figure 9:
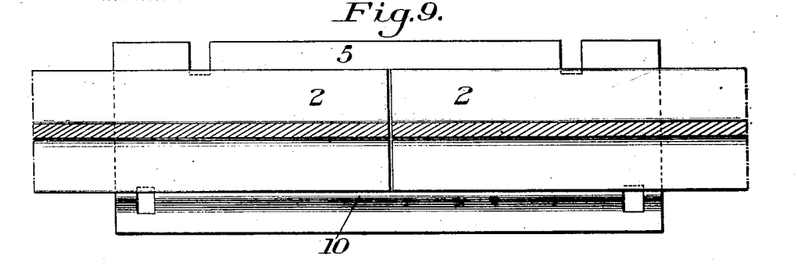
Fig. 9 is a sectional plan view of the structure shown in Fig. 8.

Fig. 8 is a side elevation of Fig. 7, and illustrates the extension of the rail seat beyond both ends of the splice bar in order to provide means for spiking directly on the bases of the rails at the shouldered side of the tie plate. The relationship of the shoulder 10 to the spike slots and to the rails is clearly shown in Fig. 9.

Figure 10:
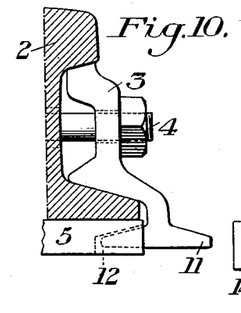
Figs. 10, 11 and 12 are sectional views showing other forms of the invention.
Figure 11:
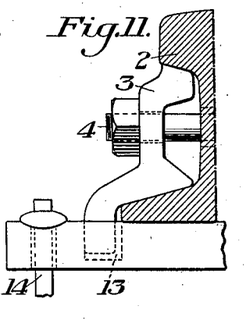

Fig. 10 shows a modified form of splice bar in which the extension below the rail base spreads out into a bottom chord, with lateral flanges 11. The clearance in the rail seat 5 in this instance is in the form of a recess 12, in the edge of the intermediate portion of the rail seat, and which is of such depth as to permit comparatively free movement of the splice bar and still maintain a sufficiently definite relationship between it and the rail seat to prevent excessive longitudinal movement of the splice bar with reference to the rail seat. Fig. 11 shows another way of maintaining this same relationship of the splice bar to the rail seat. In this case this is accomplished by means of a recess 13 in the top of the rail seat. The rail seat is also here shown as extended laterally beyond the foot of the splice bar so as to limit the transverse as well as the longitudinal movement of the splice bar with reference to the rail seat, this outward extension also affording means for fastening it to a tie, as indicated at 14.

Figure 12:
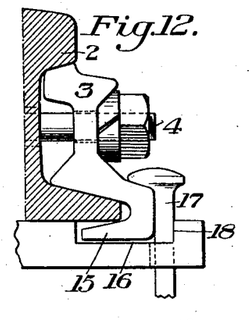

Fig. 12 shows a splice bar of the general form of that shown in Figs. 1 and 3, but having its depending foot portion 15 bending inwardly underneath the base flange of the rail and into a recess 16 in the rail seat. The latter is also extended laterally to provide means for fastening it to a tie, as indicated at 17. The recess 16 extends the full length of the rail seat, and its upright outer edge 18 provides a backing for the spikes 17.

Figure 13:
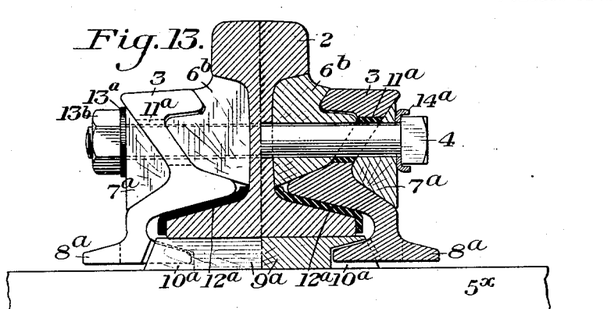
Fig. 13 is a view partly in end elevation and partly in vertical section showing our invention applied to one form of insulated joint.
Figure 14:
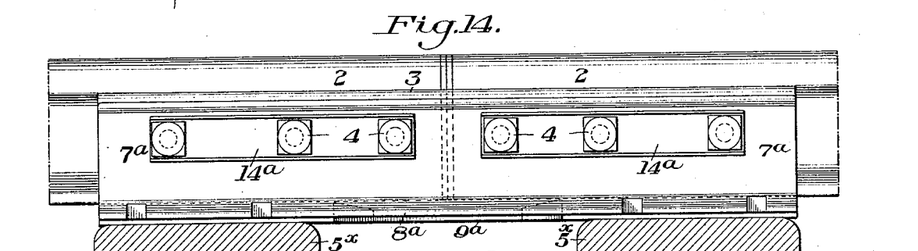
Fig. 14 is a side view of the structure of Fig. 13 with the rail ties in section.
Figure 15:
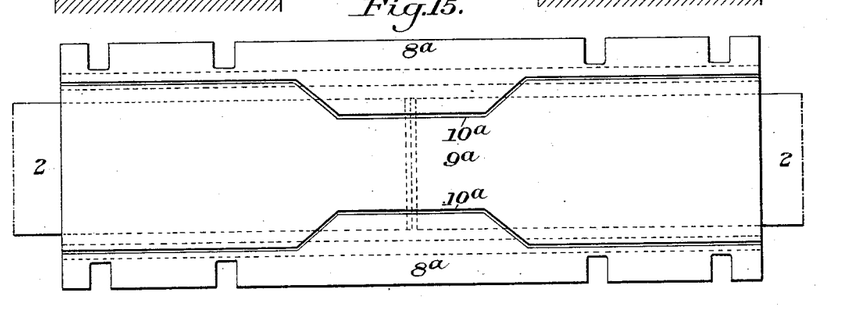
Fig. 15 is a bottom plan view.

Figs. 13, 14 and 15 show the application of our invention to an insulated rail joint. The splice bars 3 are here shown as having an upper portion of general Z-form, with an enlarged head and a downwardly and inwardly slanting web. $6^b$ designates wooden blocks, which are interposed between the slanting webs of the splice bars and the webs of the rails. $7^a$ designates wooden blocks of triangular cross-section, which are clamped by the joint bolts against the slanting outer faces of the splice bars so as to be forced downwardly against the upper surfaces of the intermediate portions of the bars. This clamping action prevents the bars from creeping outwardly at the bottom, and the webs of the bars being clamped by the blocks on either side along slanting lines, all the parts are caused to act together positively to afford great stiffness and resiliency, with broad supporting and resisting faces, resulting in largely eliminating the wear and destruction of the wooden blocks. The splice bars are formed with depending foot portions $8^a$ having flanges extending laterally in both an inward and an outward direction so as to give the bars a maximum stiffness. The rails are seated on a wooden block $9^a$, which is undercut at opposite sides of the central portion shown at $10^a$ in order to receive the inwardly projecting flanges of the splice bars, these inwardly projecting flanges being at the central portion only of said bars. The block $9^a$ rests upon the ties $5^x$, its lower seating face being in a lower plane than the bottoms of the bases of the splice bars, so that the block will take all the weight and thus eliminate any tendency to spread the bars apart, such as would occur if they rested directly upon the tie and the tie became worn directly under the rails. While we have shown the block $9^a$ as being made of wood, it may be made of metal and insulated from the bottoms of the rails in any desired manner. $11^a$ designates insulating thimbles around the joint bolts, where they extend through the web of the splice bars; and $12^a$ indicates insulating material interposed between the upper surfaces of the base flanges of the rails and the bottom surfaces of the intermediate portions of the splice bars. The outer triangular blocks $7^a$ are shown as extending the full length of the splice bars. The nuts $13^b$ for the clamping bolts are shown as seated against circular plate washers $13^a$; while the heads of the bolts are shown as seating in channel washers $14^a$, which prevent the bolts from turning. Instead of the triangular blocks $7^a$, any other suitable means may be provided for affording vertical seating faces for the nut heads or bolts; and any suitable means may also be provided for preventing the bolts from turning. Fig. 15 shows clearly the cutting away of the bottom seating member $9^a$ at the central portions thereof so as to clear the inwardly projecting flanges of the splice bars, these flanges being cut away at the ends of the bars to allow the seating member to have a full wide bearing on its ties at its ends.

Figure 16:
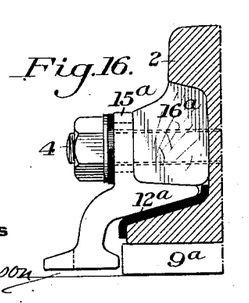
Figs. 16 to 20, both inclusive, are sectional views showing our invention applied to other forms of insulated joints.

In the modification shown in Fig. 16, the bar has a vertical member portion $15^a$, with a rectangular wooden block $16^a$ seated between it and the web of the rail, the outer face of this upper portion of the bar forming an outer vertical bolting face. The foot of the bar is similar in shape to that shown in Fig. 13, except that the inner flange is somewhat shortened and does not interlock or interfit with the block $9^a$ which forms the rail seat.

Figure 17:
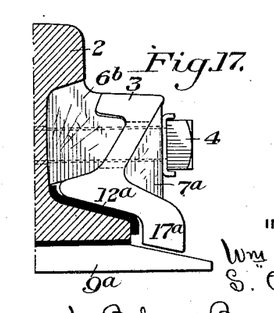

The form of our invention shown in Fig. 17 is similar to the form shown in Fig. 13, except that the depending portion $17^a$ of the splice bar extends vertically downward and is thicker where it is intersected by the plane of the bottom face of the rail base, and instead of interlocking with the rail seat, as shown in Fig. 13, or lying alongside the rail seat, as shown in Fig. 16, it extends downwardly below the bottom face of the rail base and has the under face of this downwardly extending portion lying close to and at substantially the same angle as the inclined upper face of the rail seat which lies outside the rail base.

Figure 18:
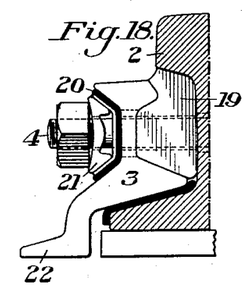

Fig. 18 shows the application of our invention to a splice bar having an upper portion of channel or I-beam form, a block 19 of wood being interposed between the bar and the web of the rail. The channeled outer face of the bar has an insulating member 20 seated therein, with a spring bridge plate 21 forming the bearing for the bolt head and nut. The foot portion of the splice bar has an outwardly projecting flange 22, but no inwardly projecting flange; and the bottom of this foot is shown as being substantially flush with the bottom of the rail-seating member.

Figure 19:
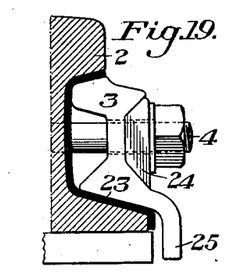

Fig. 19 shows a modification in which the upper portion of the splice bar is of somewhat similar form to that shown in Fig. 18; but the wooden block 19 is omitted, and an insulating strip 23 is employed to insulate the bar from the rail. The outer channeled face of the bar is provided with a filler block 24 to form a vertical bolting face. The bar is also shown as having a depending vertical flange 25 of uniform section.

Figure 20:
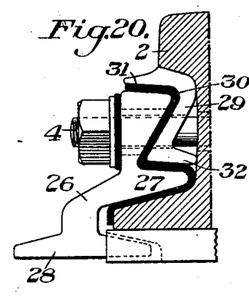

In the modification shown in Fig. 20, there is an outer splicing bar 26, having an upper portion whose inner face slants downwardly and outwardly to give a greatly reduced section which merges into an intermediate portion 27 lying above the base flange of the rail; and a flanged foot portion 28 substantially similar to that shown in Fig. 13 and interfitting with the rail-seating member in substantially the same manner as shown in Figs. 13, 14 and 15. In this form, an inside metal bar 29 is employed. This bar contacts directly with one of the rails, and is separated from the outer bar by the insulation 30. This insulation is also shown as separating the intermediate portion 27 of the splice bar from the base flange of the rail. The inner bar 29 is of general Z-form, with the two broad outer faces 31 and 32 supported by the outer bar.

Figure 21:
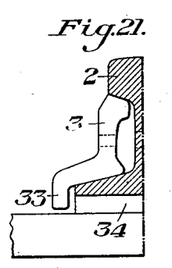
Figs. 21 to 32, inclusive, are sectional views showing still other forms of our invention.

Fig. 21 shows a splice bar with a straight reinforcing flange 33 extending below the bottom of the rail and running along the length of the bar uniformly from end to end. The rail seat 34, having its rail-bearing portion of the same width as the rail base, raises the rail high enough above the tie to afford clearance for the depending reinforcing flange to extend across the top of the tie.

Figure 22:
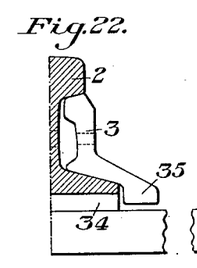

Fig. 22 shows a similar arrangement to that shown in Fig. 21, except that the reinforcing flange below the bottom of the rail is flattened out as shown at 35, in order to contain more metal.

Figure 23:
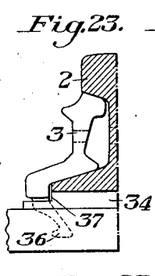

Fig. 23 shows a bar of the deep girder type, having a depending flange 36 extending down between the ties, its end portions over the ties being sheared off below the bottom of the rail, still leaving some reinforcement of the bar below the bottom of the rail at the end portions of the bar. The tie plate extends to the outer extremity of the splice bar, and has an offset at 37 to afford a clearance for the end reinforcement of the bar.

Figure 24:
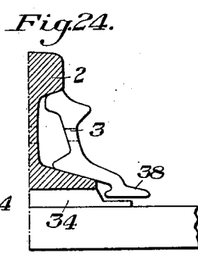

Fig. 24 is similar to Fig. 23, except that the lower reinforcing chord 38 is constructed of inner and outer ribs which form a head below the bottoms of the rails.

Figure 25:
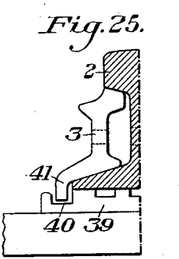

Fig. 25 is similar to Fig. 21, except that the tie plate, or rail-seating member 39, extends out beyond the splice bar and has its upper face grooved, the groove 40 at the edge of the rail foot affording clearance for the reinforcing flange 41 of the splice bar.

Figure 26:
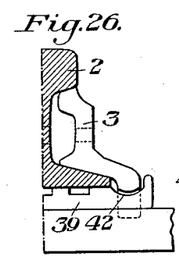

Fig. 26 shows the splice bar in the form of a girder of very heavy section around the base of the rail, the reinforcement being reduced from its full depth at the middle of the bar to a point slightly below the bottoms of the rails at its ends. The rail-seating member has a slightly different form of groove 42 to receive the reinforcing flange.

Figure 27:
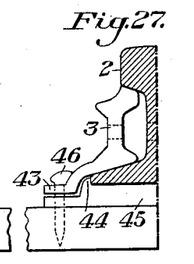

Fig. 27 shows a bar with a horizontally extending reinforcing flange 43 lying below the bottom of the rail base and at a sufficient distance from its outer edge to permit a rib 44 of the tie plate 45 to engage the outer edge of the rail foot. The splice bar is of uniform section throughout its length, and the tie plate extends to the outer edge of the splice bar. Spikes 46 are inserted in slots in the outer edge of the bar and through holes in the tie plate.

Figure 28:
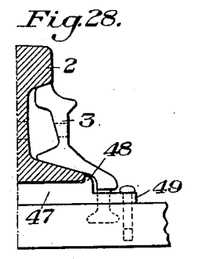

Fig. 28 shows a form similar to that shown in Fig. 26, except that the tie plate 47 has a rib 48 to engage the edge of the rail foot; and also has a wide extension 49 to bear on the tie and to provide spiking facilities beyond the edge of the splice bar.

Figure 29:
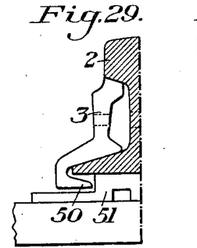
Figure 30:
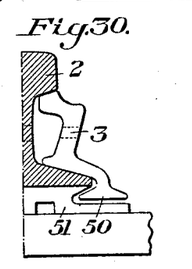

Figs. 29 and 30 are similar to Fig. 24, except that the depending reinforcements below the bottom of the rail have reëntrant flanges 50 extending under the bottom of the rail, the tie plates 51 constituting the rail seat and giving the necessary clearances between the bottoms of the rails and the tops of the ties.

Figure 31:
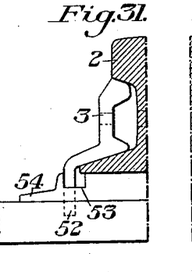

Fig. 31 is similar to Fig. 26, except that the reinforcement 52 at the end of the splice bar lying over the tie plate rests in the bottom of the groove 53 in the tie plate instead of standing clear of the plate as in Fig. 26. The tie plate in Fig. 31 has a wide bearing on the tie at 54 beyond the outermost portion of the splice bar.

Figure 32:
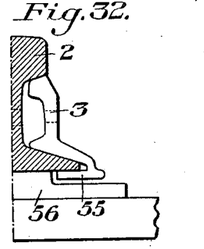

Fig. 32 shows a splice bar with a reinforcing member 55 extending under the rail base and contacting with the bottom face thereof. The tie plate 56 affords a clearance for this member extending well in toward the middle of the rail base. It also gives a wide bearing on the tie extending beyond the splice bar.

Figure 33:
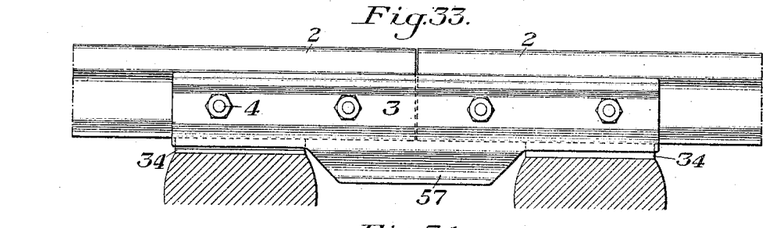
Figs. 33 to 37, inclusive, are views partly in side elevation and partly in vertical section showing different forms of the structure.

Fig. 33 shows a side elevation of a girder type bar. The deep girder portion 57 extends downwardly between the ties and is reduced rather abruptly adjacent to the edges of the ties to a section of considerably less depth. These end sections are, however, still reinforced sufficiently by the portion lying below the rail base to prevent breaking. The tie plate shown at the left-hand side of this figure is of the type illustrated in Fig. 23; while the plate to the right is similar to the arrangement shown in Fig. 21.

Figure 34:
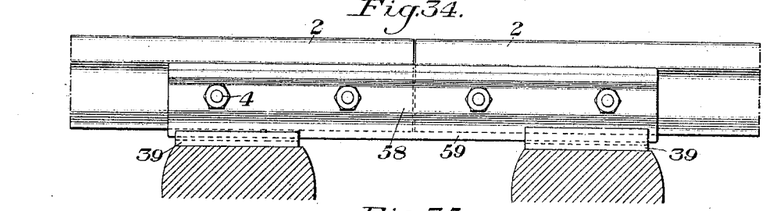

Fig. 34 shows a splice bar 58 of uniform depth throughout its length with a reinforcement 59 below the bottoms of the rails. The tie plates shown in this figure are of the form shown in section in Figs. 25 and 26.

Figure 35:
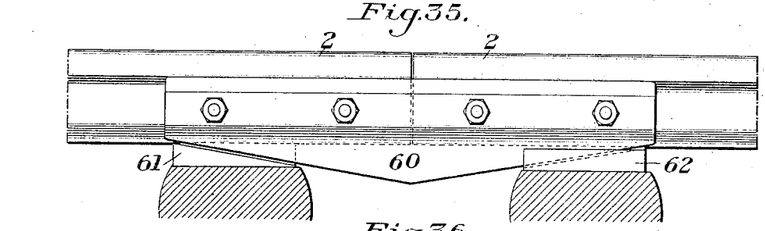

Fig. 35 shows a splice bar 60, which decreases gradually in depth from its mid section toward its ends. The tie plates 61 and 62 are similar respectively to those shown in section in Figs. 23 and 25, except that the bottoms of the clearance grooves in the plates are made slanting to conform to the incline of the splice bar reinforcement, instead of horizontally, as is required with a bar of uniform depth.

Figure 36:
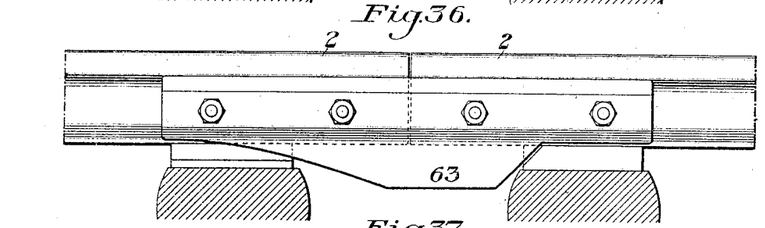

Fig. 36 shows a girder form of splice bar 63, which varies in depth from a deep mid section to a shallow end section, the section of the parts of the bar overlying the tie plates changing from a depth which extends below the bottoms of the rails to a depth lying entirely above the bottoms of the rails. A gradual change of depth with a tie plate having a horizontal clearance groove is shown at the left-hand side of the figure, while an abrupt change of depth of a tie plate having a sloping or chamfered clearance is shown at the right-hand side of the joint.

Figure 37:
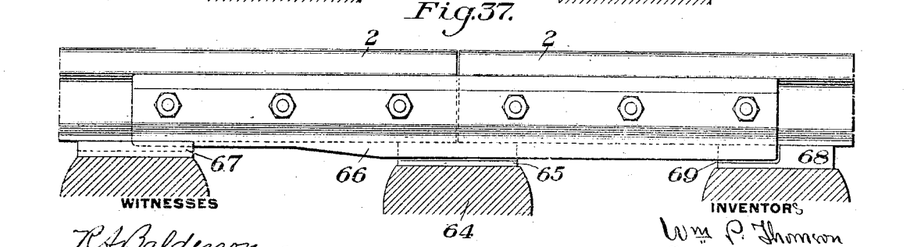

Fig. 37 shows a rail joint with a tie 64 and tie plate 65 immediately under the meeting ends of the rails. The tie plate affords a clearance for the reinforcing portion 66 of the splice bar below the bottoms of the rails and which extends entirely across the tie. The tie plates 67 and 68 at the ends of the bar extend beyond such ends. In the form shown at the left-hand side of the figure, the clearance in the plate extends entirely across the plate; while at the opposite side of the figure, the clearance is only provided in one-half the tie plate, as shown at 69, the remaining portion acting as a stop for the end of the bar to prevent creeping of the rails.

As above stated, our invention is susceptible of various other embodiments with respect to the arrangement of the top and bottom flanges of the splice bars and of the rail-seating members, the principal features, when applied to an insulated joint, being the elastic and broad insulating bearing faces which are provided in the upper portion of the structure, with deep depending flange portions extending below the bottoms of the rails and lying entirely above the bottom faces of the rail seats. Some features of our invention, however, are not necessarily limited to use in connection with these principal features.

We are aware that rail joints have been supported upon two ties, one under each rail end, with a separate chair on top of each tie to carry the rails; and that the splice bars have been extended between these rail-bearing chairs adjacent to their mid length to a point below the bottoms of the rail bases but above the plane of the top surface of the ties. Our invention is, however, an improvement over this practice, in that we do not weaken the bar by cutting it away, or by reducing its section, at the rail seat, to a point above the bottom face of the rail base, but, on the contrary, we give the bar additional strength at this point. The method of interlocking the splice bars with the rail-supporting member, as shown in several of the figures, is also believed to be a novel feature of our invention.

As above stated, the invention is equally suitable for use in connection with insulated rail joints, as it is frequently desired to locate such joint without reference to tie spacing. This is particularly the case on bridges and in the vicinity of frogs and switches. The slanting position of the bolting webs of the splice bars in the preferred insulated forms of the invention gives a great increase of lateral stiffness; while the top and bottom portions of the bars in the arrangement shown adds greatly to both the lateral and vertical stiffness.

We claim:—

1. In a rail-splicing structure, a rail, a rail seat comprising a bearing face for the bottom face of the base of said rail, said rail seat having another face extending downwardly and longitudinally of the rail from its intersection with said rail-bearing face, a means for supporting said rail seat on the road-bed, and a splice bar having a reinforcing extension lying below the plane of the bottom face of the rail base, said reinforcing extension running lengthwise of the splice bar along and adjacent to said downwardly extending face of the rail seat and directly overlying said means for supporting said rail seat, said splice bar being free of any means for clamping coaction with said rail seat, substantially as described.

2. In a rail-splicing structure, a rail seat, a means for supporting said rail seat on the road-bed, a pair of abutting rails, splice bars fitting the fishing angles of said rails and having portions extending downwardly below the bottom faces of the rail bases and overlying said means for supporting said rail seat on the road-bed, said rail seat affording a clearance longitudinally of the rail, adjacent to the outer edge of the rail base, for said downwardly extending portion of the splice bar, and suitable means for clamping the rails and splice bars tightly together, said splice bars and a rail end comprising a structure which is supported on said rail seat only on the under face of the foot of said rail, said splice bar having greater latitude of vertical and longitudinal movement than the rail seat, substantially as described.

3. A splice bar and a rail seat, said splice bar having a portion lying over said rail seat outside of one of the base flanges of the rail, said overlying portion depending freely below the bottom face of the rail foot, without any clamping coaction with said rail seat, and said rail seat providing a clearance for said depending portion, substantially as described.

4. In a rail-splicing structure, a splice bar having a portion lying over a tie and also extending below the bottom face of the rail foot, and a tie plate providing a clearance from the tie for said portion of the bar extending below the bottom face of the rail base, said splice bar being free of any rail-supporting coaction with said seat.

5. In a rail-splicing structure, a rail, a splice bar, a tie plate and a tie, said splice bar having a downwardly extending portion overlying the tie outside of the rail base, said tie plate having a rail-bearing face lying in a plane above the lowest extremity of said downwardly extending portion of the splice bar and also having a tie-bearing face lying in a plane below the lowest extremity of said downwardly extending portion of the splice bar, said splice bar being free of any means clamping it to said seat.

6. In a rail-splicing structure, a splice bar having a uniform depth throughout its length, said bar having a portion lying over a tie and extending below the bottom face of the rail base, and a tie plate on said tie affording a seat for the rail and providing a clearance from the tie for said portion of the splice bar extending below the bottom face of the rail base, said splice bar being free to move toward the rail to take up wear.

7. In a rail-splicing structure, a splice bar having a uniform depth throughout its length and having a portion lying below the bottom face of the rail base, and a rail seat lying between the bottom of the rail and the tie, said seat being of substantially less length than the splice bar and having its bottom face lying below the lowermost portion of said splice bar, said splice bar being free to move upwardly away from said seat.

8. A splice bar having a portion projecting a uniform distance below the bottom face of the rail foot for the entire length of the bar, and a rail seat of substantially less length than said bar and having its rail bearing face in a plane above the lowermost portion of said bar, said splice bar being free of any clamping means fastening it directly to said rail seat.

9. A splice bar having a portion projecting below the bottom face of the rail base and having substantially the same section throughout its length, and a rail seat having its bottom face below the lowermost portion of said splice bar, said splice bar being free of any clamping bolts fastening it directly to said rail seat.

10. A splice bar having a freely depending portion projecting below the bottom face of the rail foot for the entire length of said bar, and a rail seat of substantially less length than the length of the splice bar, said seat having its bottom tie bearing face lying below the lowermost extremity of the portion of the bar which extends lengthwise of the bar adjacent to and along said seat.

11. In a rail-splicing structure, a splice bar having a portion extending over a tie and projecting downwardly below the bottom face of the rail base, and a rail seat to rest on one tie only, said seat having its bottom tie bearing face in a plane below the lowermost portion of the part of the splice bar which lies over the tie, said splice bar being free of any rail-supporting coaction with said rail seat.

12. The combination of a tie plate resting on one tie only, a rail seated on said tie plate, and a splice bar fastened to the rail and standing free from the lower portion of the rail web and extending longitudinally of the rail over said tie plate, the portion of said splice bar which extends over the tie plate projecting downwardly below the bottom face of the rail base.

13. The combination of a splice bar and tie plate, said tie plate being less than one-half the length of said splice bar, part of said bar overlying said plate outside of one of the flanges of the rail foot, and extending below the bottom face of the rail foot, said splice bar and tie plate being free of means for engaging them in clamped relationship to each other, substantially as described.

14. In a rail-splicing structure, a rail, a rail seat having a bearing face for the bottom face of the base of said rail and another face extending downwardly from its intersection with said rail bearing face, and a splice bar having a reinforcing portion extending below the plane of the bottom face of the rail base, said reinforcing portion lying longitudinally of the rail along and adjacent to said downwardly extending face of the rail seat and free from any bolts clamping it to said rail seat, and means for insulating said rail seat and splice bar from said rail.

In testimony whereof, we have hereunto set our hands.

WILLIAM P. THOMSON.
SAMUEL G. THOMSON.

Witnesses:
McLeod Thomson,
Morris L. Kolb.

Copies of this patent may be obtained for five cents each, by addressing the "Commissioner of Patents, Washington, D. C."